Patented Aug. 10, 1943

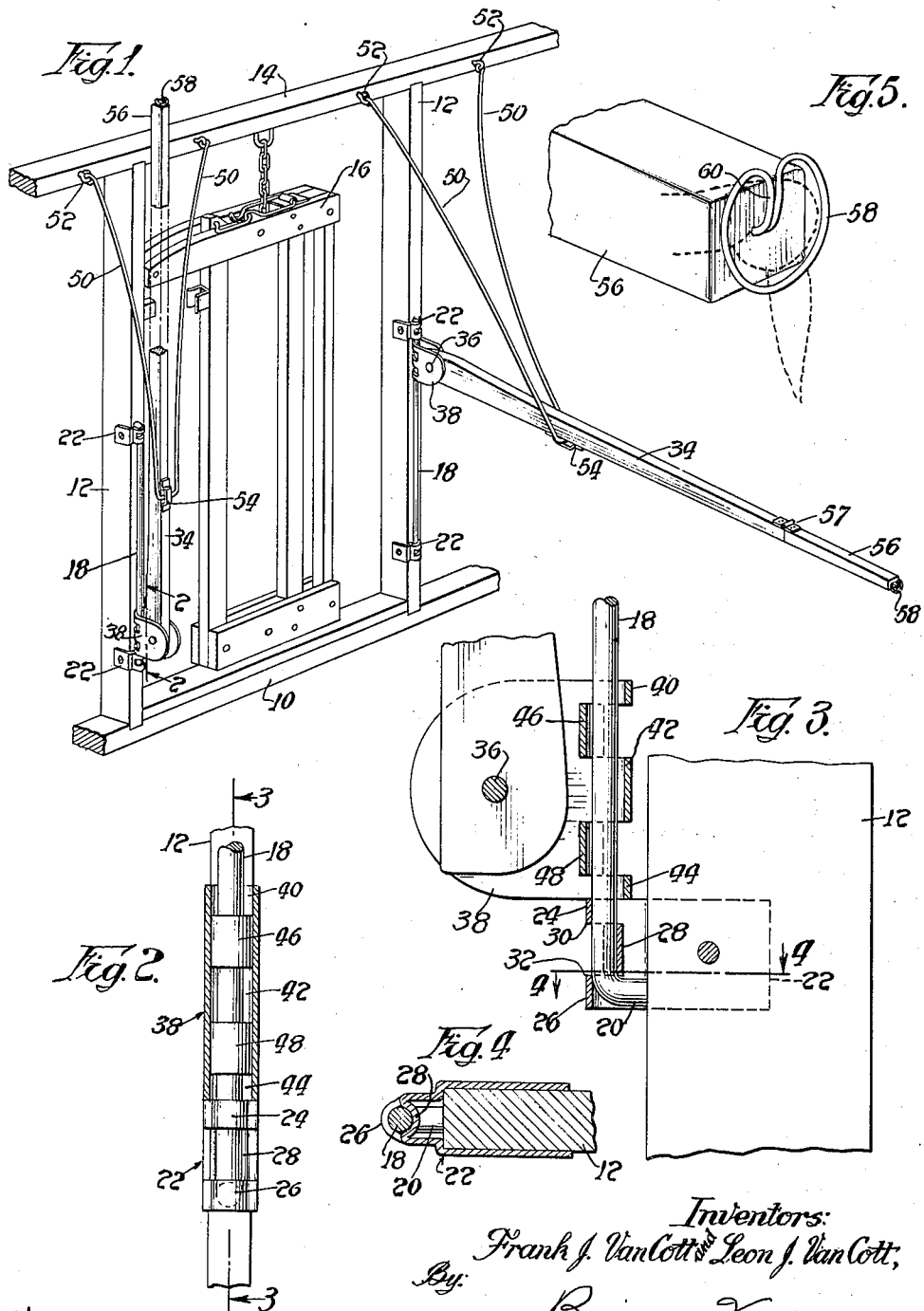

2,326,582

UNITED STATES PATENT OFFICE 2,326,582

STALL PARTITION

Frank J. Van Cott and Leon J. Van Cott, Unadilla, N. Y.

Application February 19, 1940, Serial No. 319,730

6 Claims. (Cl. 119—15)

In cases where domestic animals are kept in stalls it is frequently desirable to provide a partition to separate adjacent animals.

Particularly in a dairy barn it is desirable to separate the cows for a number of reasons. A proper partition holds the cows in place during the milking operation, keeps the cows cleaner because they cannot turn sideways on the platform, and prevents a cow from stepping on a neighbor's udder.

Ordinary fixed partitions, however, have several disadvantages. If they are fastened to the floor they make cleaning of the floor more difficult. Furthermore, a restricted space makes it necessary for cows to back out of the stall and over the gutter when they are released after milking. A cow is awkward and is very likely to slip or stumble and sometimes fall when backing out of a stall.

Hence, it is desirable to provide a partition which can be moved out of the way to permit cleaning of the barn, and to permit cows to turn on the platform instead of backing out of the stall.

It is therefore an object of our invention to provide a movable stall partition which can be raised out of the normal partitioning position when desired.

Another object is to provide a pivotally supported partition bar in which the supporting hinge or pivot is intermediate the ends of the bar so that one end can be lowered while the other end is raised to an upright position, whereby the partition can be readily used in low-ceiling barns.

Another object is to provide a partition which does not require any fastening or support on the floor, and which thus leaves the floor substantially unobstructed for cleaning.

Another object is to provide a partition bar which can be swung up out of the normal partitioning position into an upright position, and which will stay in the upright position without a catch, latch or other auxiliary apparatus to hold it.

A further object is the provision of a partition bar having a portion adjacent the end thereof hinged or otherwise jointedly fastened to the main portion of the bar, whereby the overall length of the device can be shortened when desired, permitting the partition to be raised to vertical position even in a barn with a very low ceiling.

Still another object is to provide a partition bar which shall be particularly adaptable to holding the tail of a cow to keep the tail clean and to keep it from switching the milker in the face.

With these and other objects in view, our invention consists in the construction, arrangement and combination of the various parts of our device, whereby the objects contemplated are attained, as hereinafter more fully set forth, pointed out in our claims, and illustrated in the accompanying drawing, in which:

Figure 1 is a perspective view showing a device embodying our invention, and showing the portions of an animal stall with which the device is used.

Figure 2 is an enlarged vertical sectional view taken on the line 2—2 of Figure 1.

Figure 3 is a vertical sectional view taken on the line 3—3 of Figure 2.

Figure 4 is a fragmentary horizontal section on the line 4—4 of Figure 3.

Figure 5 is an enlarged fragmentary view showing a portion of the end of our partition bar adapted for holding the tail of an animal.

In the accompanying drawing, we have used the reference numeral 10 to indicate the bottom rail of a stall structure. Uprights 12 are fastened to the rail 10 and support a top rail 14. From the top rail 14 may be suspended a stanchion 16. The stanchion does not constitute a part of our invention and may be of any suitable construction.

The partition means of our invention includes a bar 34 which we preferably make of wood, but which may be made of any other suitably light and strong material. In its horizontal position, as at the right in Figure 1, the bar 34 is supported at a point intermediate its ends by a yoke 50. The yoke passes under the bar 34, and is retained thereagainst by a strap 54. This strap is formed to allow a limited freedom of motion of the yoke, longitudinally of the bar 34. The ends of the yoke are attached to the top rail 14 by eye bolts 52; any pivotal attachment may be used.

One end of the bar 34 is fastened to the upright 12 by means which permit the end of the bar to slide vertically along the upright. A rod 18 is fixed to the uprights 12 by retainers 22. The retainers are slit in their mid-portion to form parallel straps 24, 26 and 28. The strap portion 28 is struck inwardly, so that it passes around the inside of the rod 18, as shown in Figure 4. The straps 24 and 26 pass around the outside of the rod.

Two retainers formed as described are slipped onto the rod, and short stubs 20 at the ends of the rod are turned at right angles to the principal portion of it, thus holding the retainers on the rod.

When the fastening is made to the uprights 12 the retainers 22 are separated as far as possible along the rod 18 so that the stubs 20 are brought into engagement with the straps 28 on the retainers 22. Thus, after the retainers are fastened to the uprights, longitudinal vertical movement of the rod 18 is prevented.

The strips 22 are preferably formed of wrought iron or similar malleable material so that they can be hammered into shape to conform to various kinds of uprights 12.

The rod 18 is mounted with the stub portions 20 turned inwardly toward the upright 12 whereby the rod is spaced away from the upright, leaving ample room for sliding action of the partition mounting.

The partition bar 34 is fastened on a pivot 36 which passes through a U-shaped clip 38 formed in a manner very similar to the retainers 22. The clip 38 has straps 40, 42 and 44 which pass on one side of the rod 18, and straps 46 and 48 which pass on the other side of the rod. The strap portions 46 and 48 are formed in much the same manner as the strap 28 on the strips 22.

The straps 40, 42 and 44 and the straps 46 and 48 have a loose sliding fit around the rod 18, so that the end of the bar 34 which is mounted in the clip 38 may be easily moved in a vertical direction, guided by the rod 18.

It will thus be seen that a mounting of the partition bar 34 is obtained whereby the bar may be optionally moved into substantially horizontal position, as shown at the right of Figure 1, or may be tipped up into vertical position, as at the left in Figure 1.

It will be appreciated that the sliding mount of the pivoted end of the bar 34 permits a partition bar of suitable length to be used in a barn with a low ceiling, because although the partition when in use must be supported at a height perhaps two feet from the floor, in order to be effective, yet the pivoted end slides downwardly as the bar is tipped to vertical position and thus gives greater head clearance with a bar of given length than would be the case if the bar had a fixed pivot mounting to the upright 12 at the proper height.

It may be desirable in some cases to have a bar 34 of such length that even our sliding mount for the pivoted end will not allow the bar to clear a low ceiling. In such a case we supplement the bar 34 by an extension piece 56 which may be attached to the bar 34 by a hinge 57 or in any other suitable manner.

If a hinge such as 57 is used we prefer to place it on the top side of the bar 34, inasmuch as the extension piece 56 can be opened into extended position as shown at the right in Figure 1, when the bar 34 is in horizontal position and the extension will be supported in proper position by the abutment of its hinged end with the end of the bar 34. When it is desired to raise the partition out of the way the extension piece 56 is first folded over onto the bar 34, and the bar 34 is then raised to vertical position.

It is preferable to proportion the bar 34, and any extension piece such as 56, in such a manner that the centroid or center of gravity of the assembly shall come at some point beyond the attachment of the yoke member 50. In other words, the center of gravity of the assembly shown in Figure 1 as consisting of the bar 34 and the extension 56 should be at a point somewhat to the right, in the figure, of the strap 54.

Assuming that the partition is being moved from the position at the left of Figure 1 to the position at the right of that figure, it will be understood that any further movement, after the position at the right is reached, would result in downward movement of all points on the bar beyond the strap 54. The center of gravity is one such point, and to say that further movement of the partition would lower the center of gravity is simply to say that the partition will remain stably in the extended position. Further movement is limited by the engagement of the clip 38 with the upper retainer 22, but no additional means is required to hold the device at this limit of its movement.

On the other hand, as the partition is raised, and approaches the position shown at the left in Figure 1, the center of gravity is again moving downwardly, and the bar will therefore remain safely in the upright position, without the necessity of any latch, catch, or other weights than the partition itself to hold it. There is no danger or hazard of injury or annoyance from the possibility that the bar may fall out of place because of a defective latch.

The fact that our partition bar is mounted with loose joints, and by members (such as the yoke 54) which permit considerable flexibility, makes it adaptable for supporting the tail of an animal, without much danger of injury to the animal. Particularly with cows it is frequently desirable to hold the tail in some manner to keep it from switching in the milker's face. On the end of the partition bar 34 we provide a loop which may be formed of a rod or heavy wire, and the form of which is most clearly shown in Figure 5. The portion 58 of the loop is formed substantially as a circle and is supported at a short distance from the end of the extension piece 56 by the portion 60. The bushy part of the animal's tail is hooked around the portion 60 and given one or perhaps two turns thereabout, thus forming a hitch which does not readily become disengaged. The ring portion 58 constitutes an enlargement which keeps the hitch from loosening.

The partition bar which we have thus provided has a number of distinctive advantages. It can be easily moved into partitioning position before the live stock are driven into the stalls but it can be moved into out-of-the-way position with equal ease when desired, as during the milking operation, or when turning the stock out of the stalls.

The vertical position of the bar when not in use does away with the possibility of hitting one's head while cleaning the platform, or while stanchioning or milking the stock. The loose fastenings of the pivot mountings of the partition bar, and particularly the freedom allowed by the elongated loop in the strap 54, permit the bar to move upward some distance and fall back in place in case an animal should get up under the bar after lying down.

The tail-holding device on the end of the bar may be formed of spring wire, thus forming a bumper on the end of the bar, which prevents injury to stock if they move against the end of the bar.

Some changes may be made in the construction and arrangement of the parts of our device without departing from the real spirit and purpose of our invention, and it is our intention to cover by our claims, any modified forms of structure or use of mechanical equivalents, which may be reasonably included within their scope.

We claim as our invention:

1. A construction for a stall partition including support means, a guide rod supported in vertical position on said support means, a U-shaped member extending loosely around said rod, stop means limiting upward movement of said U-shaped member on said rod, a partition member pivotally supported between the legs of said U-shaped member, and a yoke, the ends of said yoke being pivotally secured to said support means at horizontally spaced points above said guide rod and the midpoint of said yoke being attached to said partition member.

2. In a stall partition for low-ceiling barns, a support, a partition bar, means slidably mounting one end of said bar on said support, a stop limiting upward movement of said mounting means, a V-shaped yoke having its apex secured to said bar intermediate the ends thereof and its legs secured to said support at horizontally spaced points above the mounting of said bar on said support, and extension means on the free end of said bar.

3. In an animal stall construction, a supporting frame, a partition bar, means slidably mounting one end of said partition bar on said supporting frame, stop means on said supporting frame to limit upward movement of the slidable mounting means at a point where said partition bar is substantially horizontal, and rigid tie means pivotally secured to said partition bar intermediate the ends thereof, and also pivotally secured to said supporting frame, whereby raising of the outer end of said partition bar causes the lower end thereof to move downwardly on said slidable mounting means.

4. In a partition for an animal stall, a supporting frame, a partition bar, means mounting one end of said partition bar for vertical sliding movement on said supporting frame, stop means limiting upward movement of said one end of said partition bar, tie means pivotally secured to said partition bar intermediate the ends thereof, said tie means being also pivotally secured to said supporting frame above said mounting means, a hinge on the upper side of the free end of said partition bar, and an extension member attached to said bar by said hinge, the abutting relations of the ends of said bar and said extension member holding the latter in extended position when opened outward.

5. In a stanchion partition, superimposed spaced brackets secured on the stanchion, a rod mounted on the stanchion by said brackets and arranged vertically, a partition bar, a collar slidable on the rod and pivotally connected to said bar whereby said bar may assume vertical and horizontal positions, and a substantially V-shaped yoke including a connecting portion and diverging arms and having the connecting portion journaled on the bar and having the free ends of the arms hinged on said stanchion in a plane above the uppermost bracket.

6. In a stanchion partition having a partition bar, one end of which is slidable vertically on a rod mounted on the stanchion, means for joining the bar to the rod consisting of a U-shaped member, the side plates of the U embracing the end of the bar and being pivotally connected thereto, and the bend of the U being horizontally slit to form a plurality of straps, alternate ones of which pass on opposite sides of the rod, stop means limiting the upward movement of said U-shaped member with respect to said rod, and rigid V-shaped tie means pivotally connected at its mid-point to a point on said bar intermediate the ends thereof, and pivotally connected at its ends to horizontally spaced points on the stanchion.

FRANK J. VAN COTT.
LEON J. VAN COTT.